United States Patent [19]
Varlas

[11] 3,879,244
[45] Apr. 22, 1975

[54] METHOD OF MAKING HIGH MODULUS GRAPHITE FIBER REINFORCED TUBES

[75] Inventor: Mike Varlas, San Diego, Calif.

[73] Assignee: The United States of America as represented by the Secretary of the Air Force, Washington, D.C.

[22] Filed: Apr. 18, 1973

[21] Appl. No.: 352,385

[52] U.S. Cl............................... 156/192; 161/170
[51] Int. Cl............................................ B65h 71/00
[58] Field of Search............ 156/60, 190, 192, 184, 156/176, 177, 162, 195, 165, 446, 181; 138/141; 161/170; 117/46 CG

[56] References Cited
UNITED STATES PATENTS

| | | |
|---|---|---|
| 3,260,010 | 7/1966 | Dubois............................ 138/141 X |
| 3,573,123 | 3/1971 | Siegel et al...................... 156/192 X |
| 3,629,049 | 12/1971 | Olcott........................ 117/46 CG X |
| 3,641,870 | 2/1972 | Eig................................. 156/195 X |
| 3,700,535 | 10/1972 | McCoy et al.................. 161/170 X |
| 3,796,616 | 3/1974 | Northway.......................... 156/60 |

Primary Examiner—Charles E. Van Horn
Assistant Examiner—David A. Simmons
Attorney, Agent, or Firm—William J. O'Brien

[57] ABSTRACT

The invention concerns itself with a method for fabricating a tubular structural element having a wall structure composed of layers of a graphite fiber-reinforced resin composite in which the graphite fibers are oriented 45° from the zero degree longitudinal axis of the tubular element.

1 Claim, 3 Drawing Figures

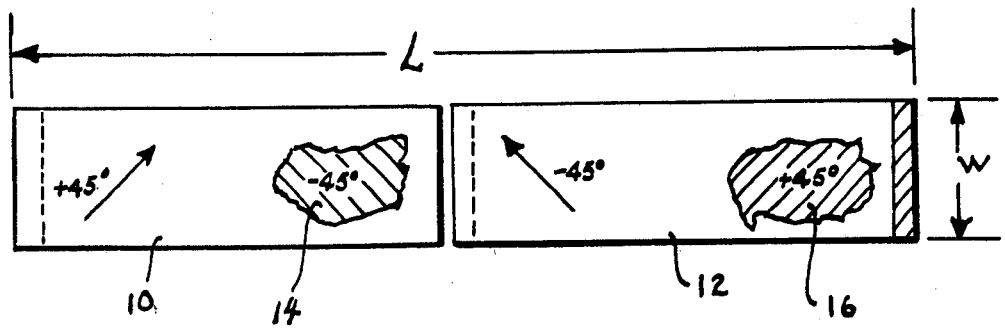
FIG. 1
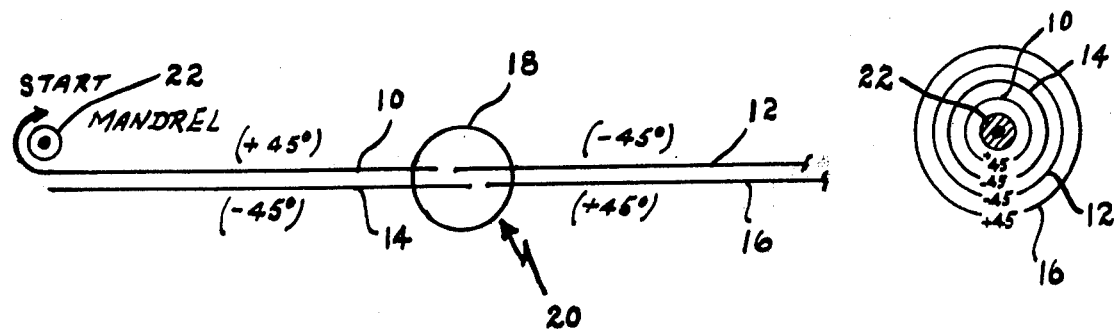
FIG. 3
FIG. 2

METHOD OF MAKING HIGH MODULUS GRAPHITE FIBER REINFORCED TUBES

BACKGROUND OF THE INVENTION

This invention relates to a composite laminated tubular member and, more particularly, to a laminated tubular member fabricated from plies of a graphite fiber reinforced resin composite.

The present interest in the utilization of high speed and high altitude aircraft, missiles and rockets, as well as in a wide variety of other technical applications, has created a need for tubular structural elements that are characterized by having the necessary dimensional and structural strength and stability to withstand the severe conditions of stress and strain that are encountered in a high temperature environment. Graphite fiber yarns as well as resin reinforced fiber yarns possess the necessary stability and resistance to the degradative effects of very high temperatures.

As a consequence, it has been suggested that these materials be employed in the fabrication of structural elements. However, when fabricated into tubular elements, they lack the requisite strength and dimensional integrity needed for fabrication into structural members. Various attempts at overcoming this problem have not proved fruitful. For example, tubular elements made from graphite filter laminates or graphite film laminates with alternating lamina of resin impregnatic paper or metal films lacked dimensional stability and structural integrity. The tubes which employed resin impregnated paper lamina also lacked sufficient high temperature resistance to make the tubes useful in an elevated temperature environment.

With the present invention, however, it has been found that tubular elements can be fabricated by a method that makes them especially valuable as structural material for use in various high temperature applications. It possesses a high degree of dimensional integrity and overall structural stability, even when subjected to the adverse conditions encountered during the high altitude operation of present day aircraft and missiles.

SUMMARY OF THE INVENTION

In accordance with this invention, it has been discovered that tubular elements having dimensional and structural strength coupled with a high resistance to the degradative effects of high temperature can be fabricated by a method which utilizes plies of resin impregnated graphite fiber composites. The basic fabrication approach is to make a flat layup by combining two plies of resin impregnated graphite fiber sheets such that the alternate layers of graphite fibers are oriented plus or minus 45° from the longitudinal axis of the plies. The flat layup is then compacted under pressure to form a composite flat structure which in turn is formed into a tubular element by any conventional tube forming means such that the tube wall is of a balanced composite construction having alternate layers of graphite fibers oriented ± 45° from a zero degree longitudinal axis.

Accordingly, the primary object of this invention is to provide a method for fabricating tubular elements especially suited for use as structural material within a high temperature environment.

Another object of this invention is to provide a method for fabricating tubular elements from resin impregnated graphite fiber materials.

Still another object of this invention is to fabricate tubular elements that are capable of retaining their dimensional integrity and structural stability during periods of stress and strain at elevated temperatures.

A further object of this invention is to provide graphite fiber-reinforced resin composites of a tubular configuration and having a tubular wall structure which is comprised of alternate layers of graphite fibers oriented ± 45° from a zero degree longitudinal axis.

The above and still other objects and advantages of the present invention will become readily apparent upon consideration of the following detailed description thereof when taken in conjunction with the accompanying drawings. In the several views of the drawing, like reference characters indicate the same or similar elements.

DESCRIPTION OF THE DRAWINGS

In the drawings:

FIG. 1 is a schematic illustration showing a top view of the laminated flat layup of this invention;

FIG. 2 is a schematic illustration showing a side view of the laminated flat layup of this invention prior to tube formation; and FIG. 3 is a schematic illustration in cross section of a finished tube element fabricated in accordance with this invention.

DESCRIPTION OF THE PREFERRED EMBODIMENT

Pursuant to the above objects, the present invention contemplates a method for fabricating tubular elements having alternate layers of graphite fiber reinforced resin composites in which the graphite fibers are oriented, ± 45° from the zero degree longitudinal axis of the tube. The method of the invention involves the steps of forming a flat layup of specified dimensions by cutting and combining two plies of a graphite fiber reinforced resin composite in which the fibers are oriented ± 45° from the longitudinal axis of the plies. The flat layup is then precompacted using heat and pressure before fabrication into a tubular configuration in accordance with conventional tube-wrapping processes.

The method of the invention is further illustrated by referring to the drawings. FIG. 1 discloses a top view of the flat layup of the invention and points out the particular orientation of the graphite fibers. A first ply 10 of a graphite fiber reinforced resin composite having fibers oriented + 45° from the zero degree longitudinal axis of the ply as indicated by the letter L, is butted to the end of a second ply 12 which, as indicated, is oriented − 45° from the axis L. Both plies are placed on top of a second group of plies 14 and 16 which are alternately oriented ± 45° as indicated in FIG. 1. The letter W represents the width of the reinforced ply and also represents the length of the finished wrapped tube in a zero degree axis. The plies 10 and 14 are superposed respectively to plies 12 and 16 in an over-lapping relationship as indicated at 18 of FIG. 2. The resulting flat layup is then precompacted using heat (175° ± 10°F) and pressure (vacuum plus 25 to 75 psig). The flat layup 20 which consists of the plies with staggered butt joints that are precompacted is then wrapped around a suitable mandrel 22 and formed into a tube in accordance with conventional tube wrapping processes. For example, the plies may be wrapped around a Teflon coated mandrel by hand or formed into tubes in accordance with the conventional match-metal die approach. In this approach, the general fabrication procedure is as follows:

1. Mandrel preparation is accomplished by making a male assembly by machining an aluminum rod including appropriate pressure inlets and outlets. Next, a tube mandrel is machined and a conventional release coating, such as Frekote 33, is baked on at a temperature of about 375°F for 30 minutes.

2. The bladder application is carried out by shrinking a polyethylene tubing over the machined aluminum mandrel by heating in an oven at 375°. While hot, a release coating of Frekote 33 is baked on.

3. Using a conventional rolling table or equivalent, the tube mandrel of (1) is rolled with precompacted layers of the ± 45° oriented graphite fiber reinforced resin components.

4. The separation and bleeder application is accomplished by spiral wrapping Armalon separator and one or two plies of spiral wrapped CW–1850 paper bleeder strip and Armalon separator over the rolled tube mandrel.

5. The male assembly of (1) is then inserted into the wrapped tube mandrel with glass fiber reinforced tape placed at the ends of the tube mandrel.

6. The outer seal bag is applied by using an envelope vacuum bag.

7. The entire assembly including the aluminum outer mandrel and the inner tube mandrel is then autoclave-cured at 350°F for 2 hours.

8. The tube part removal is accomplished since the male assembly usually slides out of the tube mandrel after 45 minutes in the oven at 270°F and the tube part slides off the male mandrel. The tube part bleeder is forced out when necessary.

The utilization of a conventional tube wrapping process such as that described above or the use of a hand wrapping tube forming process produces a tubular element of the type shown in FIG. 3. As shown in FIG. 3, it can be seen that the tubular element is composed of laminated plies having graphite fiber oriented ± 45° from the longitudinal zero axis of the tube.

The resin impregnant employed in preparing the graphite fiber composites of this invention may be a high temperature epoxy or polyimide resin capable of a 350° to 600°F operation.

Typical resin contents, as determined by the acid digestion/peroxide method, measured between 31 to 34 percent by weight. Fiberite $x$–904, an epoxy resin, and Monanto RS–6234, a polyimide resin were found to be most suitable when used in combination with Courtwald's high strength graphite fibers or Celanese's high modulus graphite fibers to fabricate the fiber-reinforced resin composite used in making the tubular elements of the invention.

Although the invention has been described with reference to particular embodiments thereof, it is to be understood by those skilled in the art that all the modifications and alternative embodiments encompassed within the appended claims are intended to be included herein.

What is claimed is:

1. A method for fabricating a tubular structural member which comprises the steps of:
   a. providing a ply of a graphite fiber-reinforced resin composite pre-cut to predetermined dimensions and consisting of a pair of sections butted together, each section having parallel running fibers oriented 45° from a zero degree longitudinal axis such that the fibers of each section are orthogonally oriented with respect to each other;
   b. forming a flat-layup by combining a plurality of said oriented plies in juxtaposed relationship such that parallel running fibers of superposed layers generally have an orthogonal relationship to each other;
   c. compressing said flat-layup at a temperature and pressure sufficient to compact said layers;
   d. wrapping said compacted flat-layup around the outer surface of a tube forming mandrel;
   e. curing said wrapped layup at a temperature and pressure sufficient to form a tube around said mandrel; and
   f. removing said mandrel.

* * * * *